United States Patent [19]

Raycher

[11] 3,932,724

[45] Jan. 13, 1976

[54] STUD WELDING APPARATUS

[75] Inventor: Robert J. Raycher, Brunswick, Ohio

[73] Assignee: Tru-Fit Products Corporation, Medina, Ohio

[22] Filed: June 3, 1974

[21] Appl. No.: 475,460

[52] U.S. Cl. .................................. 219/98; 219/113
[51] Int. Cl.² .......................................... B23K 9/20
[58] Field of Search ............. 219/98, 99, 113; 320/1

[56] References Cited
UNITED STATES PATENTS

| | | | |
|---|---|---|---|
| 3,414,701 | 12/1968 | Guettel | 219/98 |
| 3,456,090 | 7/1969 | Wenrich et al. | 219/98 |
| 3,519,787 | 7/1970 | Kroy | 219/98 |
| 3,532,851 | 10/1970 | Glorioso | 219/98 |

Primary Examiner—J. V. Truhe
Assistant Examiner—N. D. Herkamp
Attorney, Agent, or Firm—Woodling, Krost, Granger & Rust

[57] ABSTRACT

A capacitance discharge stud welding apparatus which comprises a housing. A coil is positioned in the housing and an armature is located within the coil and is movable between first and second positions relative to the coil. A stud chuck is provided for the purpose of holding a stud and is connected to the armature for movement therewith. A relatively light spring constantly urges the armature and the stud chuck toward the first position of the armature in the direction of a metal member to which a stud held by the chuck is to be welded. Engagement of the stud held by the chuck with a metal member causes the armature to move to the second position relative to the coil and against the urging of the light spring. An electrical welding current circuit is provided and electrical connection means connect the welding current circuit to the chuck and to a stud held thereby. Additionally, an electrical coil circuit is provided which is electrically connected to the coil for energizing the coil to move the armature to the aforementioned first position.

22 Claims, 4 Drawing Figures

STUD WELDING APPARATUS

In what is referred to in the art as capacitor discharge stud welding, a capacitor or bank of capacitors is charged to a desired voltage and welding is accomplished by discharging the capacitor across the contact between the stud and a workpiece. This type of stud welding involves several variations which include maintaining the stud in contact with the workpiece at all times and discharging the capacitor; spacing the stud from the workpiece and then moving it in the direction of the workpiece with discharge of the capacitor occurring when the stud contacts this workpiece; and drawing an arc between the end of a stud and a workpiece as it is moved away from the workpiece and then discharging the capacitor and moving the stud back into contact with the workpiece. Capacitor discharge-type stud welding is used to a large degree in welding smaller type studs and particularly these type studs to thin metal members.

In prior art capacitor discharge stud welding apparatus a spring was utilized to control the speed of the plunge or in other words the speed at which the stud contacted the work after welding current had been impressed across the tip of the stud and the work. By increasing the spring strength, the time of plunge could be shortened and conversely by decreasing the spring strength the time could be lengthened. The approach to controlling the time of plunge is quite a "hit and miss" procedure for the unskilled operator. In order to weld aluminum studs the spring pressure had to be changed and when a heavy spring was required the stud tips were malled and the aluminum workpiece was indented resulting in poor welds.

The present invention is designed to obviate these difficulties in that the plunge of the stud is controlled electrically, as distinguished from a spring, by energizing the coil of a solenoid to plunge the stud. This is accomplished in timed relation to the discharge of the welding current across the tip of the stud at the workpiece.

The absence of a spring for plunging the stud, in turn assures that neither the stud tips nor the metal workpiece will be damaged by spring pressure. By the use of the present invention the variation of stud extensions beyond the arc shield does not have a significant effect on the weld thereby simplifying the set up of the gun or other apparatus. Since the time of plunge is controlled electrically, no special changes are required to weld aluminum and no special gas "shielding" or "shrouding" is required.

The present invention also utilizes unique electrical circuit means for both charging and discharging the capacitor-type welding current circuit, as well as a similar solenoid coil circuit. The electrical circuit means, also, include provision for de-energizing the charging circuits when either the gun switch is actuated or the stud is in contact with the workpiece.

Other objects and a fuller understanding of this invention may be had by referring to the following description and claims, taken in conjunction with the accompanying drawings, in which:

Figure 1:
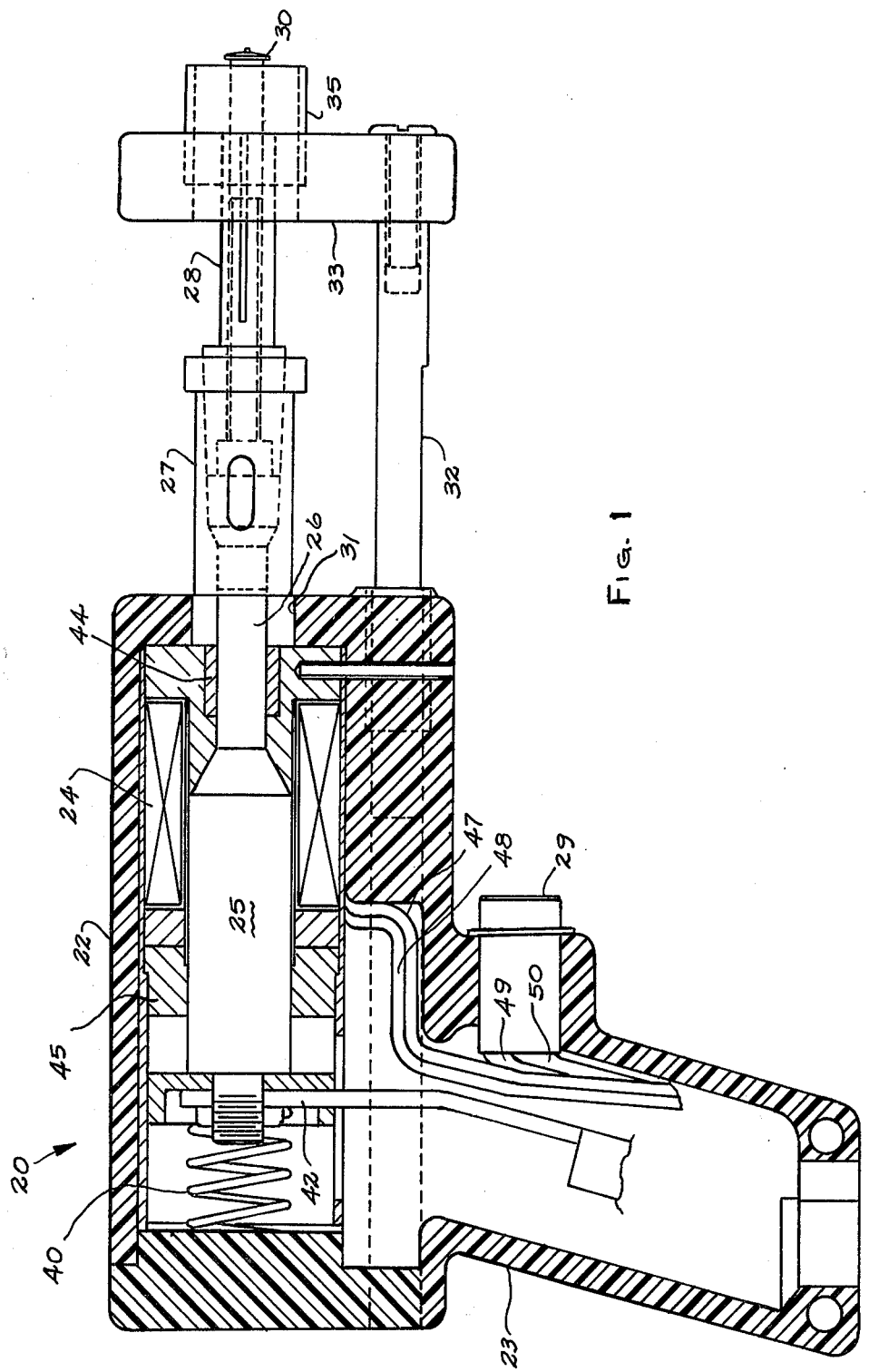
FIG. 1 is an elevational view, in section, of a welding gun constructed under the teachings of the present invention.
Figure 2:
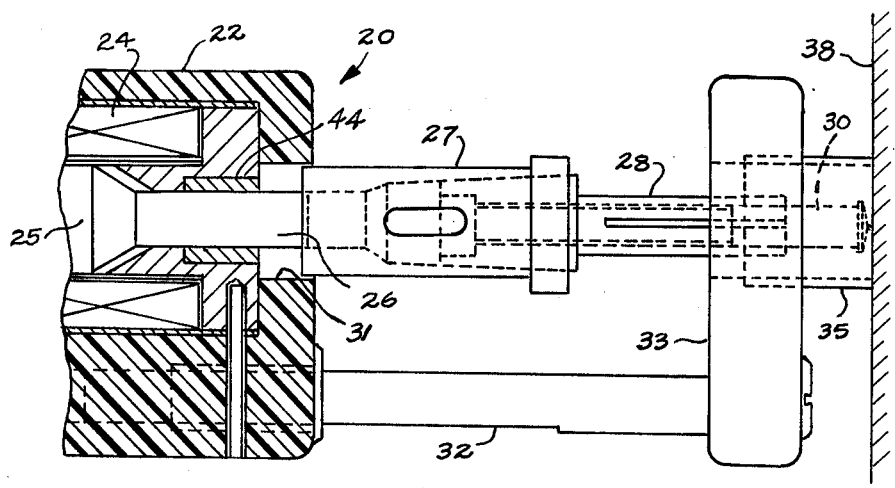
FIG. 2 is an elevational view, in section, of the welding gun shown in FIG. 1 showing the position of the parts when a stud held by the gun is brought into contact with a metal workpiece prior to welding.

The stud welding gun used in the present invention and shown in FIGS. 1 and 2 is identified generally by the reference numeral 20 and includes a housing 22 which has a pistol grip 23 and which has a finger-operated switch 29 located thereon to be manipulated by an operator of the stud welding gun.

A solenoid is arranged in the housing and includes a coil 24 which is mounted in a fixed position about a movable armature 25. The armature is movable between first and second positions relative to the coil and is located in FIG. 1 in what will be referred to as the first position and it will be noted in FIG. 2 that the armature has been retracted to what will be referred to as the second position. The armature 25 is provided with an extension 26 which extends through an opening 31 in the housing 22 and this extension is attached to a chuck adapter 27. The purpose of the chuck adapter is to provide for the convenient attachment of various size chucks thereto. In this particular circumstance a given chuck 28 is shown secured to the chuck adapter and is adapted to move therewith. In turn the chuck 28 is shown in FIGS. 1 and 2 as appropriately securing a weld stud 30 thereto.

A leg 32 is secured at one end to the housing 22 and extends in this particular instance outwardly and generally parallel with the chuck adapter 27. A foot 33 is secured to the opposite end of the leg 32 by means of a threaded member as shown and the foot 33 serves to hold an arc shield 35, the purpose of which is generally to shield the arc which occurs during the stud welding operation.

At the opposite end of the armature 25 there is provided a bus-bar assembly 42 which serves to provide for the electrical connection to enable the welding current to be transmitted from the power source to the tip of the stud 30 which is in engagement with a metal workpiece 38 as shown in FIG. 2. Bearings 44 and 45 are provided within the housing 22 to facilitate the easy movement of the armature 25 in its movement between the aforementioned first and second positions.

It will be noted in FIG. 1 the stud is located in a position with its end slightly beyond the extreme end of the arc shield 35 and as the stud is brought into contact with the metal workpiece 38 as shown in FIG. 2, the stud is mechanically pushed back or retracted and all of the components to which it is attached, for example, the chuck 28, the chuck adapter 27 and the armature 25 are, also, retracted the same amount. These components are retracted against the urging of a light spring 40 and the purpose of the light spring 40 is simply to provide a proper reference position for the tip of the stud or in other words the spring is simply for the purpose of assuring that at the commencement of the stud welding operation the tip of the stud will be in physical contact with the metal workpiece 38. Electrical conductors 47 and 48 provide for electrical connection to the coil 24 for the purpose of energizing the coil. Conductors 49 and 50 extend through the finger actuated switch 29 which switch is identified schematically in FIG. 3.

Figure 3:
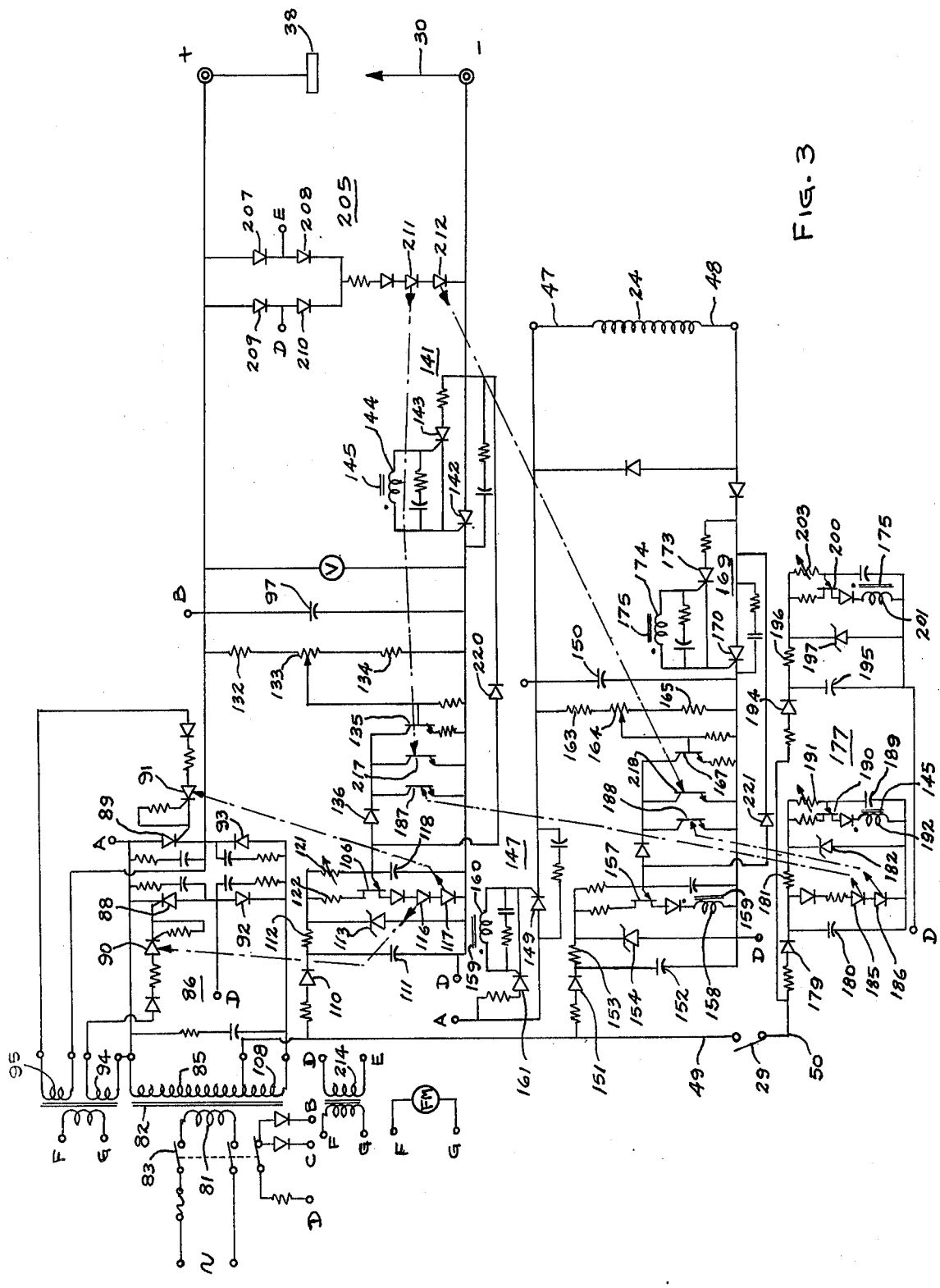
FIG. 3 is a circuit diagram of the electrical circuit for use with the gun of FIG. 1.

FIG. 3 of the drawings disclose an electrical welding current circuit and electrical connection means for connecting this circuit to the chuck 28 and to the stud 30 which is held thereby. Additionally, FIG. 3 discloses an electrical solenoid circuit connected to the coil 24 through the conductors 47 and 48 for energizing the coil to move the armature back to the first position of FIG. 1 from the second position shown in FIG. 2 after the weld current has been caused to pass across the tip of the stud 30 and the metal workpiece 38 causing the stud to be appropriately and timely moved into the molten pool of metal. The description hereinbelow will be a detailed description of the electrical circuits shown in FIG. 3 and will, also, discuss the meaning of FIG. 4 which as explained hereinabove is a graph showing weld current during the stud welding operation and indicates, also, on this curve the point in time when the stud is moved into the molten metal at the workpiece 38 upon the energization of the coil 24.

FIG. 3 is a schematic diagram for a device for energizing the stud welding gun 20 for welding the stud 30 to the workpiece 38. A primary winding 81 of transformer 82 receives line voltage through a main power switch 83. A secondary winding 85 of transformer 82 is connected to a bridge circuit 86 comprising diodes 92 and 93 and thyristors 88 and 89 whose gates are respectively connected to photothyristors 90 and 91. Thyristors 90 and 91 are powered from secondary windings 94 and 95. The bridge circuit 86 functions as a full-wave rectifier circuit when photothyristors 90 and 91 receive light to trigger thyristors 88 and 89 into conduction. The absence of light shining on photothyristors 90 and 91 will cause thyristors 88 and 89 to cease conduction.

A secondary winding 108 of transformer 82 is applied to a half-wave rectifier circuit comprising diode 110, capacitor 111, resistor 112 and Zener diode 113. The output of this voltage supply is applied to an oscillator circuit comprising unijunction transistor (UJT) 106, light emitting diodes 116 and 117, capacitor 118, potentiometer 121 and resistor 122. The light emitting diodes 116 and 117 are respectively coupled to the photothyristors 90 and 91. During oscillation of unijunction transistor 106, the light emitting diodes 116 and 117 provide light to photothyristors 90 and 91 to cause conduction through thyristors 88 and 89.

The output of the bridge circuit 86 is connected to a welding capacitor 97 for storing a welding charge. A voltage divider network including resistor 132 potentiometer 133 and resistor 134 provide base bias for a transistor 135. The collector of transistor 135 is connected through diode 136 to the base of unijunction transistor 106. Potentiometer 133 is adjusted such that when a predetermined voltage exists on welding capacitor 97, the conduction of transistor 135 will terminate oscillation of unijunction transistor 106 and light emission of light emitting diodes 116 and 117. Consequently, the welding capacitor 97 will receive a predetermined charge to insure uniform welding.

The welding capacitor 97 is connected in series with the workpiece 38 and the stud 30 and welding switch means 141 shown as a thyristor 142 having a pilot thyristor 143 connected in a latch circuit which is triggered by a secondary winding 144 of a pulse transformer 145. A pulse upon the secondary winding 144 of pulse transformer 145 will cause conduction of pilot thyristor 143 to latch thyristor 142 into conduction to discharge welding capacitor 97 through the workpiece 38 and the stud 30 to cause welding thereby.

A solenoid power supply circuit 147 connected to the secondary winding 85 of transformer 82 through connection points A includes switch means shown as thyristor 149 for charging a solenoid capacitor 150. A half-wave rectifier circuit comprising diode 151, capacitor 152, resistor 153 and Zener diode 154 applies power to an oscillator circuit comprising unijunction transistor 157 and a primary winding 158 of a pulse transformer 159. A secondary winding 160 of the pulse transformer 159 is connected to a pilot thyristor 161 to latch thyristor 149 into conduction to charge solenoid capacitor 150. A voltage divider network comprising resistor 163, potentiometer 164 and resistor 165 controls base bias to transistor 167. The collector of transistor 167 is connected to the base of unijunction transistor 157 to terminate oscillation thereof when the voltage on solenoid capacitor 150 equals a predetermined value. Consequently, the transistors 167 and 157 will terminate charging of capacitor 150 when the voltage thereon equals a predetermined value selected by potentiometer 164.

The solenoid capacitor 150 is connected through conductors 47 and 48 in series with the solenoid coil 24 and solenoid switch means 169 in this embodiment shown as thyristor 170 having a pilot thyristor 173 connected in a latch circuit which is triggered by a secondary winding 174 of a pulse transformer 175. Conduction of thyristor 170 discharges solenoid capacitor 150 through the solenoid coil 24 to move the stud 30 relative to the workpiece 38.

The main switch 29 located in the stud welding gun applies power through conductors 49 and 50 to a timing circuit shown generally as 177 comprising a first rectifier circuit including diode 179, capacitor 180, resistor 181 and Zener diode 182. Light emitting diodes 185 and 186 are optically coupled to phototransistors 187 and 188 which shunt unijunction transistors 106 and 157, respectively. When the switch 29 is closed the light emitting diodes 185 and 186 cause conduction of phototransistors 187 and 188 to cease oscillation of unijunction transistors 106 and 157 to terminate charging of the welding capacitor 97 and the solenoid capacitor 150. This insures that the charging of the welding and solenoid capacitors is terminated prior to the discharge of the welding and solenoid capacitors.

Switch 29 applies power to a first oscillator circuit having a first time constant comprising a capacitor 189 unijunction transistor 190 a potentiometer 191 and a primary winding 192 of pulse transformer 145. A rectifier circuit comprising a diode 194, capacitor 195, resistor 196 and Zener diode 197 supplies power to a second oscillator circuit having a second time constant comprising unijunction transistor 200, a primary winding 201 of pulse transformer 175 and a potentiometer 203. Potentiometers 191 and 203 vary the time at which a pulse appears on the primary winding 192 of pulse transformer 145 relative to the time a pulse appears on the primary winding 201 of pulse transformer 175. The pulses on primary windings 192 and 201 are reflected on the secondary windings 144 and 174 to trigger thyristors 142 and 170, respectively.

A contact sensing circuit 205 comprises diodes 207 through 210 and light emitting diodes 211 and 212. Power is applied to the contact sensing circuit by a secondary winding 214 connected to points D and E.

The light emitting diodes 211 and 212 are optically coupled to phototransistors 217 and 218 to cause conduction of phototransistors 217 and 218 for terminating oscillation of unijunction transistors 106 and 157. Consequently, upon contact of the stud 30 to the workpiece 38 a complete circuit is formed causing light emitting diodes 211 and 212 to emit light thereby terminating charging to the welding and solenoid capacitors 97 and 150.

The circuit may be described as operating in the following manner. When the switch 83 is closed, the primary winding 81 causes a voltage to be induced in the secondary winding 85 and in the secondary 108 to cause oscillation of unijunction transistor 106. Light emitted from light emitting diodes 116 and 117 cause conduction of thyristors 88 and 89 to charge welding capacitor 97. When the voltage upon welding capacitor 97 reaches a predetermined value, the conduction of transistor 135 terminates oscillation of unijunction transistor 106 and likewise terminates charging of welding capacitor 97. Power, also, is delivered to unijunction transistor 157 to cause oscillation to be transferred through pulse transformer 159 to cause conduction of thyristor 149 to charge solenoid capacitor 150. When the voltage on solenoid capacitor 150 reaches a predetermined value, the conduction of transistor 167 terminates oscillation of unijunction transistor 157 and likewise terminates charging of solenoid capacitor 150.

The stud 30 is then brought into contact with the workpiece 38 by an operator to close the contact circuit 205. Light from light emitting diodes 211 and 212 cause conduction of phototransistors 217 and 218 to terminate oscillation of unijunction transistors 106 and 157 and cease charging of welding capacitor 97 and solenoid capacitor 150. The stud 30, also, moves into the second position as shown in FIG. 2. When the operator closes switch 29 located on the pistol grip 23 of the stud welding gun 20, light emitting diodes 185 and 186 cause conduction of phototransistors 187 and 188 to further insure the termination of charging of welding capacitor 97 and solenoid capacitor 150.

Figure 4:
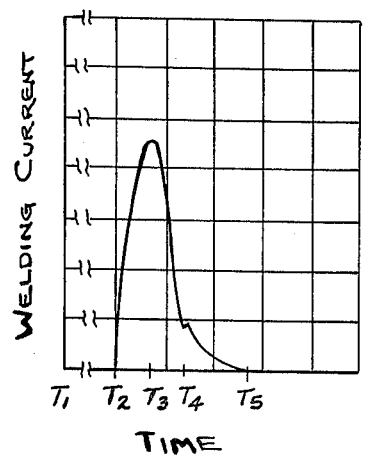
FIG. 4 is a curve representing weld current, generated by the circuit of FIG. 3 during the welding operation.

FIG. 4 is a graph of welding current as a function of time. The time of closing switch 29 is represented as $T_1$ in FIG. 4. Thereafter, a period of time determined by potentiometer 191 elapses before a pulse appears on the primary winding 192 to trigger thyristor 142 to discharge the welding current between the stud 30 and the workpiece 38. The triggering of thyristor 142 is designated $T_2$ in FIG. 4. The time between $T_1$ and $T_2$ is established to insure that the thyristors in the supply circuits 86 and 147 are completely off. The welding current increases in intensity to a maximum at $T_3$ in FIG. 4 to melt the end of the stud 30 and the adjacent region of the workpiece 38. The welding current gradually decreases until $T_4$, whereat the stud 30 is advanced into the molten pool of the workpiece 38 and stud end to form the weld while welding capacitor 97 continues to discharge until $T_5$. The stud is so advanced by the solenoid because the unijunction transistor 200 causes a pulse in primary winding 201 which energizes thyristor 170 which in turn discharges solenoid capacitor 150 through the solenoid coil 24. The welding process is thus completed.

The circuit in FIG. 3 includes diodes 220 and 221 connecting the bases of unijunction transistors 106 and 157 to the thyristors 142 and 170, respectively. In the event that either of the thyristors 142 or 170 shorts, then oscillation of the respective unijunction transistor is prevented thereby preventing charging of the welding or solenoid capacitors 97 and 150.

The invention includes a device for energizing the stud welding gun 20 for welding the stud 30 to the workpiece 38 which stud is movable in the gun by the solenoid having the solenoid coil 24 comprising the welding capacitor 97 and the welding power circuit 86. Means including transistors 106 and 135 connect the welding capacitor 97 to the welding power circuit 86 for charging the welding capacitor to a predetermined value. Welding switch means 141 connects the welding capacitor 97 for discharging the welding capacitor through the stud 30 and the workpiece 38. Solenoid switch means 169 interconnects the solenoid power supply comprising the rectifier circuit 147 and capacitor 150 for energizing the solenoid coil 24. The timing circuit is connected by pulse transformers 145 and 175 to commence discharging of the welding capacitor 97 through the stud 30 and workpiece 38 and thereafter to move the stud relative to the workpiece 38 by energizing the solenoid coil 24.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A capacitance discharge stud welding apparatus including in combination a housing, a coil in said housing, an armature movable between first and second positions relative to said coil, a stud chuck, means connecting said stud chuck to said armature, a welding shield secured to said housing and positioned so as to shield the welding of a stud to a metal member which stud is held by said chuck, a relatively light spring constantly urging said armature and said stud chuck toward said first position in the direction of the metal member to which a stud held by said chuck is to be welded, engagement of a stud held by said chuck with a metal member causing said armature to move to said second position relative to said coil and against the urging of said light spring, an electrical welding current circuit, electrical connection means connecting said welding current circuit to said chuck and to a stud held thereby, an electrical coil circuit electrically connected to said coil for energizing the same to move said armature to said first position.

2. A device for energizing a stud welding gun for welding a stud to a workpiece, comprising in combination: a solenoid, means connecting the stud to be welded to the solenoid for movement of the stud relative to the workpiece, a welding capacitor, a welding power circuit, means connecting said welding capacitor to said welding power circuit for charging said welding capacitor to a predetermined value, welding switch means connected to said welding capacitor for discharging said welding capacitor through the stud and the workpiece, solenoid switch means, a solenoid power supply, means connecting said solenoid switch means to said solenoid power supply for energizing said solenoid, a timing circuit, a power switch for activating said timing circuit, and means connecting said timing circuit to said welding and solenoid switch means to discharge said welding capacitor through the stud and the workpiece upon activation of said timing circuit and to energize said solenoid with said solenoid power supply to move the stud toward the workpiece.

3. A device as set forth in claim 2, wherein said welding power circuit includes switch means to terminate charging of said welding capacitor when the voltage thereon equals a predetermined value.

4. A device as set forth in claim 3, wherein said welding power circuit switch means includes photoswitch means, and said means connecting said welding capacitor to said welding power circuit includes a welding control circuit having photoemission means coupled to said photoswitch means in said welding power circuit.

5. A device as set forth in claim 2, including means for coupling said timing circuit with said welding power circuit to terminate charging of said welding capacitor during discharge of said welding capacitor.

6. A device as set forth in claim 5, wherein said coupling means includes photocoupling means.

7. A device as set forth in claim 2, including a contact sensor circuit coupled to said welding power circuit to terminate charging of said welding capacitor during contact of the stud to the workpiece.

8. A device as set forth in claim 7, wherein said sensor circuit is coupled to said welding power circuit by photocoupling means.

9. A device as set forth in claim 2, wherein said solenoid power supply includes a solenoid capacitor, a solenoid power circuit including switch means, means connecting said solenoid capacitor to said solenoid power circuit for charging said solenoid capacitor, and a solenoid control circuit connected between said solenoid capacitor and said solenoid power circuit to control said switch means of said solenoid power circuit to terminate charging of said solenoid capacitor when the voltage thereon equals a predetermined value.

10. A device as set forth in claim 2, wherein said timing circuit includes a first trigger circuit having a first time constant for energizing said welding switch means and a second trigger circuit having a second time constant for energizing said solenoid switch means.

11. A device as set forth in claim 2, wherein said means connecting said timing circuit to said welding and solenoid switch means includes a latch circuit connecting said timing circuit to said welding switch means.

12. A capacitance discharge stud welding apparatus including in combination, a solenoid comprising a coil and an armature, said armature movable between first and second positions relative to said coil, a stud chuck adapted to hold a stud to be welded, means connecting said stud chuck to said armature, means for enabling movement of said armature to said second position relative to said coil and away from the workpiece and away from said first position upon engagement of the stud held by said chuck with a metal workpiece to which the stud is to be welded, an electrical welding current circuit connected to the stud to be welded, an electrical coil circuit electrically connected to said coil for energizing the same to move said armature to said first position from said second position and toward the metal workpiece to which the stud is to be welded.

13. Apparatus as set forth in claim 12, wherein said electrical welding current circuit includes a welding capacitor, a welding power circuit, means connecting said welding capacitor to said power circuit for charging said welding capacitor to a predetermined value, welding switch means connected to said welding capacitor for discharging said welding capacitor through the stud and the workpiece; said electrical coil circuit includes solenoid switch means, a solenoid power supply and means connecting said solenoid switch means to said power supply for energizing the solenoid; and a timing circuit, a power switch for activating said timing circuit and means connecting said timing circuit to said welding and solenoid switch means to discharge said welding capacitor through the stud and the workpiece upon activation of said timing circuit and to energize said solenoid with said solenoid power supply to move the stud into contact with the workpiece to which it is to be welded.

14. A device as set forth in claim 13, wherein said welding power circuit includes switch means to terminate charging of said welding capacitor when the voltage thereon equals a predetermined value.

15. A device as set forth in claim 14, wherein said welding power circuit switch means includes photoswitch means, and said means connecting said welding capacitor to said welding power circuit includes a welding control circuit having photoemission means coupled to said photoswitch means in said welding power circuit.

16. A device as set forth in claim 13, including means for coupling said timing circuit with said welding power circuit to terminate charging of said welding capacitor during discharge of said welding capacitor.

17. A device as set forth in claim 16, wherein said coupling means includes photocoupling means.

18. A device as set forth in claim 13, including a contact sensor circuit coupled to said welding power circuit to terminate charging of said welding capacitor during contact of the stud to the workpiece.

19. A device as set forth in claim 18, wherein said sensor circuit is coupled to said welding power circuit by photocoupling means.

20. A device as set forth in claim 13, wherein said solenoid power supply includes a solenoid capacitor, a solenoid power circuit including switch means, means connecting said solenoid capacitor to said solenoid power circuit for charging said solenoid capacitor, and a solenoid control circuit connected between said solenoid capacitor and said solenoid power circuit to control said switch means of said solenoid power circuit to terminate charging of said solenoid capacitor when the voltage thereon equals a predetermined value.

21. A device as set forth in claim 13, wherein said timing circuit includes a first trigger circuit having a first time constant for energizing said welding switch means and a second trigger circuit having a second time constant for energizing said solenoid switch means.

22. A device as set forth in claim 13, wherein said means connecting said timing circuit to said welding and solenoid switch means includes a latch circuit connecting said timing circuit to said welding switch means.

* * * * *